United States Patent [19]

Waldbillig et al.

[11] 4,171,273

[45] Oct. 16, 1979

[54] FATTY ALKYL SUCCINATE ESTER AND SUCCINIMIDE MODIFIED COPOLYMERS OF ETHYLENE AND AN ALPHA OLEFIN

[75] Inventors: James O. Waldbillig; Isaac D. Rubin, both of Wappingers Falls, N.Y.

[73] Assignee: Texaco Inc., White Plains, N.Y.

[21] Appl. No.: 777,243

[22] Filed: Mar. 14, 1977

[51] Int. Cl.$^2$ .................. C08G 9/04; C08G 37/32
[52] U.S. Cl. .................. 252/51.5 A; 525/329; 525/375; 525/348; 525/383
[58] Field of Search ............... 252/51.5 A; 260/878 R

[56] References Cited

U.S. PATENT DOCUMENTS

| | | | |
|---|---|---|---|
| 3,272,746 | 9/1966 | LeSuer et al. | 252/51.5 A X |
| 3,872,019 | 3/1975 | Culbertson et al. | 252/51.5 A |
| 3,950,341 | 4/1976 | Okamoto et al. | 252/51.5 A X |
| 4,053,426 | 10/1977 | Davis et al. | 252/51.5 A X |

*Primary Examiner*—Paul F. Shaver
*Attorney, Agent, or Firm*—Thomas H. Whaley; Carl G. Ries; James J. O'Loughlin

[57] ABSTRACT

Fatty alkyl succinate ester and succinimide modified copolymers of ethylene and an alpha-olefin, such as an ethylene-propylene copolymer, are useful as shear stable viscosity index (VI) improvers, dispersants and pour point depressants in lubricating oils. Especially useful is the succinate ester of mixtures of primary n-alkanols containing about 12 to about 18 carbon atoms and the N-(3-dimethylaminopropyl) succinimide derivative of the copolymer of ethylene and an alpha-olefin, such as an ethylene-propylene copolymer. This succinate ester-succinimide derivative is prepared by reacting the copolymer in an aromatic solvent with maleic anhydride in the presence of a free radical initiator, then esterifying the anhydride with a fatty alcohol or mixtures thereof in the presence of an acidic catalyst and finally converting any unreacted anhydride and half esters to the succinimide by reaction with a polyamine containing a primary amine. Additive concentrates containing 5 to 30 wt. % of the copolymer derivative in a solvent facilitate the introduction of the additive into a lubricating oil blend.

65 Claims, No Drawings

FATTY ALKYL SUCCINATE ESTER AND SUCCINIMIDE MODIFIED COPOLYMERS OF ETHYLENE AND AN ALPHA OLEFIN

BACKGROUND OF THE INVENTION

This invention relates to lubricating oil compositions having improved viscosity index, dispersency and pour depressant properties. In particular, this invention is directed to lubricating oil compositions containing succinate ester and succinimide derivatives of copolymers of ethylene and an alpha-olefin which are polyfunctional additives in that they act as a shear stable viscosity index improver as well as a pour depressant and sludge dispersant.

Various compositions and polymeric additives are known and have been employed to improve the viscosity index of lubricating oil compositions when added thereto. One such viscosity index improver additive which has proven effective not only as a viscosity index improver but has exhibited a high degree of shear stability is an amorphous copolymer of ethylene and propylene described in U.S. Pat. No. 3,522,180. However, this copolymer as well as other olefinic copolymers while being effective viscosity index improvers do not act to any substantial degree as dispersants and pour depressants in lubricating oil compositions to which they have been added.

A copending application of the assignee herein, filed on Dec. 29, 1976 as Ser. No. 756,040, discloses and claims the succinimide derivative of a copolymer of ethylene and an alpha olefin which is effective as a viscosity index improver and a dispersant in lubricating oils but which does not function as a lubricating oil pour depressant.

It is an object of this invention to provide a polyfunctional lubricating oil additive effective as a shear stable, viscosity index improver as well as a dispersant and a pour depressant.

SUMMARY OF THE INVENTION

We have found that although certain ethylene-alpha olefin copolymers are effective as viscosity index improvers they do not function to any substantial degree as pour depressants and dispersants. We have discovered that succinate and succinimide derivatives of copolymers of ethylene and an alpha-olefin will be effective as polyfunctional additives exhibiting shear stable VI improvement, pour depressancy and dispersency when minor amounts thereof are added to lubricating oils, particularly petroleum based automotive lubricating oils. An additive concentrate, containing about 5 to 30 weight percent of these copolymer derivatives in a solvent, facilitates the introduction of the additive into a final lubricating oil blend. These polyfunctional additives may be prepared by reacting an ethylene-alpha-olefin copolymer, such as ethylene-propylene copolymer with maleic anhydride in the presence of a free radical initiator. This anhydride is then reacted with a fatty alcohol to prepare the succinate ester. Any unesterified carboxylic acid or anhydride groups are then converted to the succinimide by reaction with a polyamine.

DESCRIPTION OF THE PREFERRED EMBODIMENTS

Broadly, we have found that the properties of pour depressability and dispersancy can be added to an ethylene-alpha olefin copolymer, effective as a viscosity index improver, by preparing the fatty alkyl succinate ester and succinimide modifications of said copolymers. Our invention, then, relates to the method of preparing these fatty alkyl succinate and succinimide derivatives of ethylene-alpha olefin copolymers as well as to the derivatives themselves, lubricating oils containing minor amounts of said copolymer derivatives and additive concentrates containing high concentrations of the additive in a solvent.

One embodiment of the practices of this invention relates to a method of preparing a fatty alkyl succinate ester and succinimide modified copolymer of ethylene and an alpha-olefin comprising:

(a) reacting said ethylene-alpha-olefin copolymer with maleic anhydride in the presence of a free radical initiator and a solvent for the reaction mixture to produce a resulting succinic anhydride derivative of said ethylene-alpha-olefin copolymer, (b) adding an inert liquid diluent to the resulting reaction mixture containing said succinic anhydride derivative, (c) removing remaining maleic anhydride and solvent from the resulting reaction mixture, (d) reacting the succinic anhydride derivative with a n—$C_4$ to n—$C_{22}$ alcohol or mixtures thereof in the presence of an acidic catalyst to produce the corresponding succinate ester, (e) reacting unesterified carboxylic acid or anhydride groups of said copolymer derivative with a polyamine having the formula:

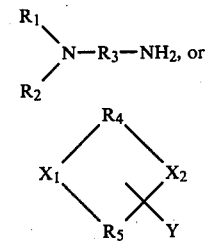

wherein $R_1$ and $R_2$ are the same or different and are alkyl radicals having 1 to 4 carbon atoms;

$R_3$ is a methylene radical having 1 to 4 carbon atoms;

$R_4$ and $R_5$ are the same or different and are methylene or methine radicals having 1 to 4 carbon atoms;

$X_1$ is O, S, NH, N—$R_1$ or $CH_2$ (if $R_4$ and $R_5$ are methylene radicals) or N or CH (if $R_4$ and $R_5$ are methine radicals);

$X_2$ is N or NH and

Y is $NH_2$ or $R_3$–$NH_2$ to produce the corresponding fatty alkyl succinate ester and succinimide modified copolymers of ethylene and alpha-olefin.

Another embodiment of the invention relates to the product prepared by the process described herein.

Still another embodiment relates to the n—$C_4$ to n—$C_{22}$ alkyl succinate and succinimide derivatives of an ethylene-alpha-olefin copolymer described herein.

A further embodiment relates to a lubricating oil composition comprising a major portion of a lubricating oil and a minor amount, sufficient to increase the viscosity index, depress the pour point and increase the dispersancy of said lubricating oil, of the n—$C_4$ to n—$C_{22}$ alkyl succinate and succinimide derivatives of an ethylene-alpha olefin copolymer described herein.

A still further embodiment relates to a lubricating oil concentrate comprising a hydrocarbon solvent and about 5 to about 30 weight percent, based on solvent, of the n—$C_4$ to n—$C_{22}$ alkyl succinate and succinimide derivatives of an ethylene-alpha olefin copolymer described herein.

More particularly, and in accordance with one of the embodiments of this invention which is directed to the method of preparing the copolymer derivatives, a solution containing about 10–40 wt.% of an ethylene-alpha olefin copolymer in a suitable aromatic solvent containing no benzylic hydrogens, e.g. benzene, chlorobenzene, and the like, is prepared. In particular, an ethylene-propylene copolymer useful as a VI improver in lubricating oils, particularly petroleum based automotive lubricating oils, is preferred. The resulting solution of aromatic solvent and copolymer is heated to a temperature of about 80°–130° C. in the presence of added excess maleic anhydride and a small amount of a free radical initiator, such as dibenzoyl peroxide, dicumyl peroxide or azobisisobutyronitrile. The resulting reaction product is the corresponding succinic anhydride derived by the addition of RH across the double bond of the maleic anhydride wherein R is an ethylene-alpha olefin copolymeric radical. There is then added to this resulting reaction mixture, a relatively high boiling, substantially inert diluent oil and the excess unreacted maleic anhydride and solvent is removed by a vacuum distillation. The remaining copolymer succinic anhydride, i.e., the succinic anhydride grafted onto the ethylene-alpha olefin copolymer, is converted to the corresponding succinate ester by heating the succinic anhydride derivative with a fatty alcohol containing from about 4 to about 22, preferably about 12 to about 18, carbon atoms or mixtures of such alcohols in the presence of an acidic catalyst, such as p-toluene sulfonic acid. After this esterification, any unesterified carboxylic acid or anhydride groups of the copolymer derivative are reacted with a polyamine, viz., 3-dimethylamino-1-propylamine. Upon completion of the reaction any excess amine is removed by distillation and the resulting reaction product filtered.

As indicated hereinabove, it is preferred to employ as the ethylene-alpha olefin copolymer, an ethylene-propylene copolymer. In the practices of this invention it is preferred to employ a shear stable ethylene-propylene copolymer of the type suitable for incorporation into a lubricating oil as a VI improver. When shear stable ethylene-propylene copolymers are employed in the above-described reaction for the preparation of the succinate ester and succinimide derivative thereof, the resulting reaction product of this invention is also shear stable.

An amorphous ethylene propylene copolymer which serves as a viscosity index improvement additive in lubricating oils is particularly useful in accordance with the practices of this invention and may be prepared as described in U.S. Pat. No. 3,522,180 wherein the copolymer is prepared in a hydrogen-moderated reaction at moderate temperatures and pressures in the presence of a solvent soluble Ziegler-Natta catalyst. gaseous mixtures of propylene and ethylene together with hydrogen are introduced into a reactor containing a solvent, which does not deactivate the catalyst, such as carbon tetrachloride, hexane, n-heptane, benzene or cyclohexane. Reaction temperatures between minus 40° and 250° F. and a pressure of 0 to 300 psig are satisfactory. The two component Ziegler-Natta catalyst comprises a first component of a hydrocarbyl vanadate, a hydrocarboxy vanadyl halide or a vanadyltrihalide. The second catalyst component is an alkyl aluminum halide. Preferred catalyst systems include tri-n-butyl orthovandate as the first component and ethyl aluminum dichloride, diethylaluminum chloride or ethyl aluminum sesquichloride as the second component.

This Ziegler-Natta catalyst promoted, hydrogen moderated polymerization is used to produce ethylene-propylene copolymers having an amorphous structure, by infrared analysis, a propylene content of 20 to 70 mole percent, a number average molecular weight between about 10,000 and 100,000, and a narrow molecular weight distribution, measured by gel permeation chromatography (GPC), of less than about 5. Not only do these copolymers increase the viscosity index of lubricating when added thereto but they exhibit a substantially high resistance to the high shearing forces experienced in lubricating service which often mechanically degrade a long chain polymer.

Although it is preferred to employ a copolymer of ethylene-propylene as the ethylene-alpha olefin copolymer in accordance with this invention, alpha-olefins other than propylene are also useful in the preparation of the ethylene-alpha olefin polymers employed in the practices of this invention. Such alpha-olefins include butene-1, pentene-1, hexane-1, 4-methyl-pentene-1 and the like. As indicated hereinabove, ethylene-propylene copolymers are preferred with propylene contents in the range of 20 to 70 mole percent, preferably 30 to 60 mole percent.

As indicated hereinabove, the esterification of the copolymer derivatives is conducted with a fatty alcohol. In particular, we find that those long chain primary alcohols containing from about 4 to about 22, preferably about 12 to about 18, carbon atoms in the aliphatic hydrocarbon chain may be usefully employed. In particular, we find that technical grades of long chain primary alcohols may be suitably employed in the practice of this invention. These commercially available alcohols are mixtures of n-alkanols of various chain lengths containing between about 4 and 22 carbons in the alkyl group. Several suitable sources of these alcohol mixtures are the technical grade alcohols sold under the trademark NEODOLS by Shell Chemical Corporation and under the trademark ALFOLS by Continental Oil Company. Typical analysis of two such useful alcohols are set forth below:

|  | Typical Properties |
|---|---|
| NEODOL 25L (Synthetic Lauryl Alcohol) | Approx. homolog distribution, wt. % |
| Lighter than $C_{12}OH$ | 4 |
| $C_{12}OH$ | 24 |
| $C_{13}OH$ | 24 |
| $C_{14}OH$ | 24 |
| $C_{15}OH$ | 15 |
| $C_{16}OH$ | 2 |
| ALFOL 1620 SP (Synthetic Stearyl Alcohol) | Approx. homolog distribution, wt. % |
| $C_{14}OH$ and lighter | 4 |
| $C_{16}OH$ | 55 |
| $C_{18}OH$ | 27 |
| $C_{20}OH$ | 9 |

Useful polyamines in accordance with the practice of this invention are identified by either of the following structural formulae:

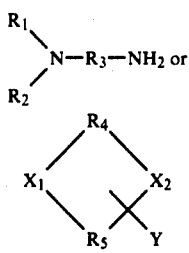

(A)

(B)

wherein $R_1$ and $R_2$ are the same or different and are alkyl radicals having 1 to 4 carbon atoms;

$R_3$ is a methylene radical having 1 to 4 carbon atoms;

$R_4$ and $R_5$ are the same or different and are methylene or methine radicals having 1 to 4 carbon atoms;

$X_1$ is O, S, NH, N—$R_1$ or $CH_2$ (if $R_4$ and $R_5$ are methylene radicals) or N or CH (if $R_4$ and $R_5$ are methine radicals);

$X_2$ is N or NH and

Y is $NH_2$ or $R_3$—$NH_2$.

In the case of formula B those skilled in the art will appreciate that in some instances one of the bonds on $X_1$ and/or $X_2$ will be a double bond depending on the nature of $X_1$, $X_2$, Y, $R_4$ and/or $R_5$, e.g., if $X_1$ or $X_2$ is N, Y is $NH_2$ and $R_4$ and/or $R_5$ are methine radicals.

Illustrative polyamines of formula A are: 3-dimethylamino-1-propylamine; 2-dimethylamino-1-ethylene, 4-dimethylamino-1-butylamine and 2-dimethylamino-1-isopropylamine, of formula B are:

2-aminopyridine, aminopyrazine, N-(3-aminopropyl) morpholine, N-(3-aminopropyl) imidazole and N-(2-aminoethyl) pyrrolidine, Suitable other polyamines are also identified in U.S. Pat. Nos. 3,329,658 and 3,449,250.

In the preparation of these copolymer derivatives in accordance with this invention, it has been noted that, to obtain the desired product properties of optimum pour depressancy and dispersant characteristics when incorporated in a lubricating oil, excess quantities of maleic anhydride should be utilized and the amount of free radical initiator employed should be controlled such that the moles of maleic anhydride bound per 100 grams of copolymer is in the range of 0.01 to 1.0. Further, the amount of alcohol employed for esterification should also be controlled to achieve the desired product properties. To this end stoichiometric excesses of 10 to 1000% of the fatty alcohols should be employed and the amount of acidic catalyst employed is controlled to effect the desired conversion. In order to convert the unesterified carboxylic acid or anhydride groups to the succinimide, between about 0.001 and 0.5 moles of polyamine per 100 grams of copolymer may be used. In general, the series of reactions should be conducted so that the final product contains in the range of about 0.01 to 1.0% by wt. nitrogen in the polymer to achieve optimum results when the resulting succinate ester-succinimide product is employed as a lubricating oil additive. The reactions are conducted normally under refluxing conditions and atmospheric pressure although in some instances it may be desirable to utilize autogeneous pressure with temperatures in the range of 80° to 200° C.

The esterification reaction can be carried out at reflux in a solvent boiling above about 80° C. and the water formed during the reaction is removed as an azeotrope. Suitable solvents are aliphatic and aromatic solvents such as toluene, xylene, isooctane, and decane. Also, halogenated hydrocarbons such as O-dichlorobenzene may be used. Alternatively, the esterification can be carried out in a mineral oil at a temperature above about 80° C. Removal of water may in this case be faciliated by blowing a stream of dry inert gas, such as nitrogen, through the reaction solution.

The reaction with the amine may be carried out at about 50°-200° C. and preferably about 100° to 150° C. Excess alcohol and/or amine may be removed by vacuum distillation at about 100° to 300° C. after the amine reaction.

As indicated hereinabove, the reaction between the ethylene-alpha-olefin copolymer, such as ethylene-propylene copolymer, in the presence of a solvent and in the presence of maleic anhydride and a free radical initiator is carried out at a temperature in the range of 80°-130° C. more or less. Higher or lower temperatures, however, may be employed, if desired. Moreover, free radical initiators other than those disclosed hereinabove are also usefully employed. Similarly, the reaction of the fatty alcohol with the resulting produced succinic anhydride may also be carried out at a suitable elevated temperature such as about 80°-200° C., more or less, as desired. Again, the reaction of the polyamine may also be carried out at a suitable elevated temperature, such as about 80°-130° C., more or less, as desired. It may be desirable and useful to conduct the reactions with the fatty alcohol and/or the polyamine under refluxing conditions to faciliate the reaction. The high boiling point, substantially inert or neutral diluent oil employed in the reactions, particularly to aid in stripping the aromatic solvent and any excess maleic anhydride or any remaining fatty alcohol or polyamine from the reaction mixture, is advantageously a petroleum based oil of lubricating oil quality so that the resultant product, the succinate ester-succinimide copolymer derivative, contained therein can be readily incorporated as an additive in lubricating oils. As indicated and demonstrated herein, inert aromatic solvents, those which contain no benzylic hydrogens, e.g. benzene and chlorobenzene and the like are preferred in the preparation of the ethylene-propylene succinic anhydride intermediate.

It is indicated hereinabove that the copolymer derivative in accordance with this invention is incorporated in minor amounts as an additive in petroleum based automotive lubricating oils. Such amounts should be sufficient to increase the viscosity index, depress the pour point and improve the dispersency of the lubricating oil with which the copolymer derivative of this invention is admixed. Such minor amounts are generally in the range of 0.05 to 10 wt.% preferably 0.5 to 1.5 wt.% of the final blend.

To faciliate the introduction of the succinate ester-succinimide copolymer derivative into a final lubricating oil blend, the additive may be prepared as a concentrate with a solvent, such as a light lubricating oil having a viscosity of between about 75 and about 300 SUS at 100° F. to form an additive concentrate containing about 5 and 30, preferably 10 and 15, wt.% of the additive.

Desirably, the copolymer succinate ester-succinimide incorporated in the lubricating oils as an additive therein would have a nitrogen content in the range of about 0.01 to 1, preferably 0.05 to 0.5, weight percent.

By employing each of the preferred reactants discussed hereinbefore, a particularly preferred copolymer derivative is prepared. Thus, utilizing a shear stable amorphous ethylene-propylene copolymer having a moderate molecular weight and a narrow molecular weight distribution, such as an amorphous ethylene-propylene copolymer having a number average molecular weight between about 20,000 and 50,000, a propylene content of about 35 to 50 mole percent and a molecular weight distribution of less than about 5 and esterifying the succinic anhydride grafted onto said copolymer with a blend of primary fatty alcohols having 12 to 22 carbon atoms and reacting any unesterified sites with the preferred polyamine, 3-(dimethylamino)-1-propylamine, can produce a copolymer derivative product having a nitrogen content of about 0.25 wt.%. A lubricating oil containing a minor amount of said product evidences superior viscosity index improvement, a low pour point and a high degree of dispersency and maintains these properties despite being subjected to high shearing forces.

The following examples illustrate embodiments of this invention.

EXAMPLE I 219 grams of a hexane solution containing 28.4 wt.% of an ethylene-propylene copolymer were dissolved in 1000 ml. of chlorobenzene. The ethylene-propylene copolymer had a number average molecular weight of about 25,000, contained about 44 mole percent propylene and was useful as a lubricating oil viscosity index improver. The mixture was heated at reflux and approximately 500 ml. of solvent, which represented most of the hexane, was removed. On cooling to about 90° C., 20.0 grams of maleic anhydride and 3.4 grams of dicumyl peroxide were added to the mixture while it was being stirred. The temperature was then raised to 130° C. and the stirred reaction mixture was held at that temperature for 16 hours. Infrared examination of a sample of the polymer separated by precipitation in boiling acetone indicated that the neat polymer contained at least 0.045 moles of bound maleic anhydride per 100 grams of copolymer. 747 grams of solvent neutral no. 5 (a high boiling point, inert, neutral diluent hydrocarbon oil) were added to the solution and the chlorobenzene solvent and excess unreacted anhydride were removed by stripping to a temperature of 100° C. at an absolute pressure of 0.1 mm Hg (ca. 13 Pascals).

185 grams of this oil solution containing the anhydride derivative were dissolved in 150 ml. of xylene at a temperature of 100° C. 25 grams of octadecanol and 0.38 grams of p-toluene sulfonic acid were then added to the solution and the resultant mixture was heated at reflux. After two hours of refluxing, about 0.2 ml. of water was removed as an azeotrope and 0.22 grams of 3-(dimethylamino)-1-propylamine (DMAPA) were then added to react with any of the unesterified carboxylic acid or anhydride groups and convert them to the succinimide. After heating at reflux for an additional two hours, the copolymer derivative was precipitated by adding the oil solution to boiling acetone. The copolymer derivative was dissolved in toluene and again precipitated in boiling acetone and recovered.

EXAMPLE II 450 grams of a benzene solution containing 24 wt.% of ethylene-propylene copolymer having a number average molecular weight of about 25,000 and a propylene content of about 41 mole% were heated at 130° C. for six hours in a stirred Parr reactor under autogenous pressure (40 psig, ca. 377 kPa) with 10 grams of maleic anhydride and 0.50 grams of dicumyl peroxide. The product obtained was then dissolved in 700 ml. of toluene and to this mixture was added 1062 grams of solvent neutral No. 5, a high boiling point, inert, neutral diluent hydrocarbon oil. The benzene solvent and excess maleic anhydride were removed by stripping the mixture to 100° C. at an absolute pressure of 0.1 mm $H_g$ (ca. 13 Pa).

590 grams of this oil solution containing the anhydride derivative were dissolved in 200 ml of xylene at 100° C. After cooling the mixture to ambient temperature, 2.3 grams of Alfol 1620 SP (a $C_{16}$–$C_{20}$ alcohol mixture sold by Continental Oil Company), 1.8 grams of Neodol 25 L (a $C_{12}$ to $C_{15}$ alcohol mixture sold by Shell Oil Company) and 0.1 grams of p-toluene sulfonic acid were added to the solution. The resultant mixture was heated at reflux and any water formed was removed as an azeotrope. Infrared analysis of a sample of the polymer derivative showed that unreacted anhydride remained. An additional quantity of 3.6 grams of Neodol 25 L and 0.1 grams of p-toluene sulfonic acid were then added. This mixture was again heated at reflux to remove a trace of water. Following cooling of the mixture to 125° C., 0.51 grams of 3-(dimethylamino)-1-propylamine were added to the reaction mixture and the heating was continued for two hours at this temperature. The resultant product was then stripped to 180° C. at an absolute pressure of 0.1 mm Hg (ca. 13 Pa). A small sample of the polymer derivative was percipitated by adding the oil solution to boiling acetone. The sample was then dissolved in a small amount of toluene and precipitated again in boiling acetone. The copolymer derivative after drying at 100° C. and an absolute pressure of 0.1 mm Hg (ca. 13 Pa) showed a nitrogen content of 0.18 weight percent.

EXAMPLE III 300 grams of a hexane solution containing about 31 wt.% of an ethylene-propylene copolymer were dissolved in 400 grams of chlorobenzene. The ethylene-propylene copolymer was the same as that of Example II and was useful as a lubricating oil viscosity index improver. The mixture was heated at reflux until a temperature of approximately 130° C. was obtained which resulted in the removal of sufficient solvent to produce a polymer concentration of about 20 wt.%. 15 grams of maleic anhydride and 1.4 grams of dicumyl peroxide were then added to the mixture while it was being stirred. The resultant mixture was maintained at 130° C. for 10 hours at which point an additional 500 milliliters of chlorobenzene and 837 grams of solvent neutral no. 5, a high boiling point, inert neutral diluent hydrocarbon oil were added. The mixture was then stripped to a temperature of 100° C. at an absolute pressure of 0.1 mm Hg (ca. 13 Pa) to remove chlorobenzene solvent and excess unreacted anhydride.

200 grams of this oil solution containing the copolymer anhydride intermediate were admixed with 150 ml. of xylene, 2.0 grams of Alfol 1620 SP, 1.0 grams of Neodol 25 L and 1.0 grams of p-toluene sulfonic acid. This mixture was heated at reflux for about 2 hours during which about 0.2 milliliters of water was removed. 5.0 grams of dodeceanol-1 were then added and the refluxing continued until no additional water came over. 0.80 grams of 3-(dimethylamino)-1-propylamine were then added to react with any of the unesterified carboxylic acid or anhydride groups and convert them to the succinimide. After heating for an additional two hours at 125° C., the copolymer derivative was precipitated in boiling acetone and redissolved in toluene and again precipitated in boiling acetone. The resultant copolymer was then stripped to 100° C. at 0.05 millimeters Hg (ca. 6.7 Pa). 20.5 grams were recovered and showed a 0.25% nitrogen content.

EXAMPLE IV

The succinic anhydride derivative preparation of Example I was repeated except that 670 grams of solvent were removed in the initial refluxing and only 612 grams of solvent neutral oil were added to the reactant mixture before stripping.

200 grams of the oil solution containing the copolymer anhydride intermediate were then admixed with 150 ml. of xylene, 3.0 grams of Alfol 1620 SP, 2.0 grams of Neodol 25 L and 1.0 grams of p-toluene sulfonic acid. This mixture was heated at reflux for about two hours during which about 0.1 ml. of water were removed. 5 grams of dodecanol-1 were then added and the mixture heated at reflux for approximately four hours during which about 0.1 ml. of water was removed. An additional quantity of 5.0 grams of dodecanol-1 was added and the mixture heated a reflux again to remove a last trace of water. Since some unreacted anhydride remained after this procedure, 1.06 grams of 3-(dimethylamino)-1-propylamine were added to convert the unesterified carboxylic acid or anhydride groups to the succinimide. The amine was added at 125° C. and the mixture was heated at this temperature for two hours. The product was stripped to 175° C. at 0.04 mm Hg (ca. 5.3 Pa.) during which about 15.0 ml. of oil and excess alcohol distilled over. The product obtained was precipitated twice in about 1500 ml. of boiling isopropyl alcohol. The polymer derivative was stripped to 100° C. at 0.05 mm Hg (ca. 6.7 Pa.). 23.0 grams of copolymer derivative were recovered and showed a 0.24 weight percent nitrogen content.

A summary of the above four preparations is presented in Table I below.

TABLE I

SUMMARY OF PREPARATION OF SUCCINATE ESTER AND SUCCINIMIDE MODIFIED COPOLYMERS OF ETHYLENE AND PROPYLENE

| EXAMPLE | Grams MA[1] Charged 100 g Copolymer | Grams DICUP[2] Charged 100g Copolymer | Moles Bound MA 100g Copolymer | Approx. Mole Ratio of Alcohols Used $n\text{-}C_{12}:(nC_{12}\text{-}C_{15}):(nC_{16}\text{-}C_{20})$ |
|---|---|---|---|---|
| I | 29.4 | 5.0 | >0.045 | (Single Alcohol used, $n\text{-}C_{18}$) |
| II | 9.3 | 0.46 | 0.020 | 0:1:1 |
| III | 16.3 | 1.53 | 0.024 | 5:1:2 |
| IV | 29.4 | 5.0 | 0.057 | 10:2:3 |

| EXAMPLE | Alcohol Molar Excess | Grams Diamine Charged 100g Copolymer | % N in Final Product |
|---|---|---|---|
| I | ca. 600% | 1.54 | — |
| II | 60% | 0.94 | 0.27 |
| III | 200–300% | 5.3 | 0.25 |
| IV | 200–300% | 5.3 | 0.24 |

[1]MA = maleic Anhydride
[2]DICUP = dicumyl peroxide

To test the properties of these copolymer derivatives as lubricating oil additives, each of the above four derivatives were and admixed with a solvent neutral oil and tested for shear stability, pour depressability and dispersant activity.

For comparison purposes, test blends were also prepared with an unmodified ethylene-propylene copolymer and a methacrylate terpolymer prepared from a 40:30:30 wt.% mixture of butyl methacrylate, Neodol 25L and Alfol 1620 SP. The results of these evaluations are shown in Table II.

TABLE II

| Copolymer | Example I | Example II | Example III | Example IV | E-P Copolymer | Methacrylate Terpolymer |
|---|---|---|---|---|---|---|
| Copolymer Conc., wt. % | 1.5 | 1.7 | 1.5 | 1.5 | 1.5 | 4.1 |
| Blend Oil | | | | | | |
| SNO-7[1] | 98.5 | 98.3 | 98.5 | 98.5 | 90.0 | 90.0 |
| SNO-5[2] | | | | | 8.5 | |
| 145 Pale[3] | | | | | | 5.9 |
| Test Data | | | | | | |
| Vis, SUS @ 210° F. | 61.8 | 63.2 | 59.5 | 62.9 | 65.5 | 70.2 |
| FISST (20 passes)[4] | | | | | | |
| Vis, SUS @ 210° F. | 55.8 | 58.2 | 55.1 | 59.2 | 61.0 | 59.6 |
| % Thickening Power loss[5] | 32 | 24 | 26 | 18 | 19 | 36 |
| Pour Point, °F. | −35 | −25 | −45 | −45 | 0 | −45 |
| CCS 0° F. c.p.[6] | 1120 (Balled on shaft) | 1420 | 1420 | 1420 | 1580 | 1290 |
| Bench Sludge (mm) | | | | | | |
| I | 2.1 | 0.4 | 0.4 | 0.3 | 0.9 | 1.1 |

TABLE II-continued

| Copolymer | Example I | Example II | Example III | Example IV | E-P Copolymer | Methacrylate Terpolymer |
|---|---|---|---|---|---|---|
| II | 2.2 | 0.6 | 0.7 | 0.7 | 3.5 | 3.5 |

Notes:
[1] SNO-7 = Solvent neutral no. 7 mineral oil, viscosity = approx. 42 SUS @ 210° F.
[2] SNO-5 = Solvent neutral no. 5 mineral oil, viscosity = approx. 40 SUS @ 210° F.
[3] 145 Pale - 145 Pale turbine stock mineral oil, viscosity = approx. 43 SUS @ 210° F.
[4] FISST - Fuel injector shear stability test
[5] Thickening power = (viscosity @ 210° F. of blend) − (viscosity @ 210° F. of base oil)
[6] CCS = Cold cranking simulator The results of the evaluation of the test blends show that the succinimide-ester derivatives of ethylene-propylene copolymers are effective pour depressants and dispersants, properties which are not manifested by the unmodified ethylene-propylene copolymer. The dispersant activity, in fact, was far superior to that of either the unmodified ethylene-propylene copolymer or the polymethacrylate additive. Further, the combination of alcohols used in Examples III & IV showed superior pour depressability over those of Examples I & II. In addition, the combination of alcohols produced more favorable results than a single alcohol such as was used as in Example I.

We claim:

1. A method of preparing a fatty alkyl succinate ester and succinimide modified copolymer of ethylene and an alpha olefin comprising:
(a) reacting said ethylene-alpha-olefin copolymer with maleic anhydride in the presence of a free radical initiator and a solvent for the reaction mixture to produce a resulting succinic anhydride derivative of said ethylene-alpha-olefin copolymer,
(b) adding an inert liquid diluent to the resulting reaction mixture containing said succinic anhydride derivative,
(c) removing remaining maleic anhydride and solvent from the resulting reaction mixture,
(d) reacting the succinic anhydride derivative with a n—$C_4$ to n—$C_{22}$ alcohol or mixtures thereof in the presence of an acidic catalyst to produce the corresponding succinate ester,
(e) reacting unesterified carboxylic acid or anhydride groups of said copolymer derivative with a polyamine having the formula:

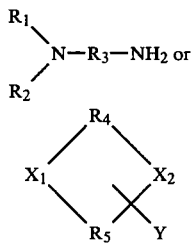

wherein
$R_1$ and $R_2$ are the same or different and are alkyl radicals having 1 to 4 carbon atoms;
$R_3$ is a methylene radical having 1 to 4 carbon atoms;
$R_4$ and $R_5$ are the same or different and are methylene or methine radicals having 1 to 4 carbon atoms;
$X_1$ is O, S, NH, N—$R_1$, or $CH_2$ (if $R_4$ and $R_5$ are methylene radicals) or N or CH (if $R_4$ and $R_5$ are methine radicals);
$X_2$ is N or NH and
$Y$ is $NH_2$ or $R_3$—$NH_2$ to produce the corresponding fatty alkyl succinate ester and succinimide modified copolymers of ethylene and alpha olefin.

2. A method according to claim 1 wherein the solvent of step (a) is an aromatic solvent containing no benzylic hydrogen.

3. A method according to claim 1 wherein the aromatic solvent is benzene or chlorobenzene.

4. A method according to claim 1 wherein the alpha olefin is propylene.

5. A method according to claim 1 wherein the ethylene-alpha-olefin is an ethylene-propylene copolymer having an amorphous structure, a number average molecular weight between about 10,000 and 100,000, a propylene content of 20 to 70 mole percent and a $M_w/M_n$ of less than about 5.

6. A method according to claim 1 wherein the reactions of steps (a), (d) and (e) are carried out at temperatures in the range of 80°–200° C.

7. A method according to claim 1 wherein the free radical initiator of step (a) is dibenzoyl peroxide, dicumyl peroxide or azobisisobutyronitrile.

8. A method according to claim 1 wherein the acidic catalyst of step (d) in p-toluene sulfonic acid.

9. A method according to claim 1 wherein the inert liquid diluent of step (b) is a high boiling point petroleum based oil.

10. A method according to claim 1 wherein the fatty alcohol of step (d) is a primary alcohol having 4 to 22 carbon atoms and mixtures thereof.

11. A method according to claim 10 wherein the fatty alcohol is a mixture of primary alcohols having about 12 to 18 carbon atoms.

12. A method according to claim 1 wherein the polyamine of step (e) is 3-(dimethylamino)-1-propylamine.

13. A method according to claim 1 wherein the fatty alkyl succinate ester-succinimide modified copolymer of ethylene and alpha olefin has a nitrogen content of about 0.01 to 1.0 weight percent nitrogen.

14. A succinate ester-succinimide derivative of a copolymer of ethylene and an alpha olefin prepared by the method of claim 1.

15. A succinate ester-succinimide derivative of a copolymer of ethylene and an alpha olefin prepared by the method of claim 2.

16. A succinate ester-sucinimide derivative of a copolymer of ethylene and an alpha olefin prepared by the method of claim 3.

17. A succinate ester-succinimide derivative of a copolymer of ethylene and an alpha olefin prepared by the method of claim 4

18. A succinate ester-succinimide derivative of a copolymer of ethylene and an alpha olefin prepared by the method of claim 5.

19. A succinate ester-succinimide derivative of a copolymer of ethylene and an alpha olefin prepared by the method of claim 6.

20. A succinate ester-succinimide derivative of a copolymer of ethylene and an alpha olefin prepared by the method of claim 7.

21. A succinate ester-succinimide derivative of a copolymer of ethylene and an alpha olefin prepared by the method of claim 8.

22. A succinate ester-succinimide derivative of a copolymer of ethylene and an alpha olefin prepared by the method of claim 9.

23. A succinate ester-succinimide derivative of a copolymer of ethylene and an alpha olefin prepared by the method of claim 10.

24. A succinate ester-succinimide derivative of a copolymer of ethylene and an alpha olefin prepared by the method of claim 11.

25. A succinate ester-succinimide derivative of a copolymer of ethylene and an alpha olefin prepared by the method of claim 12.

26. A succinate ester-succinimide derivative of a copolymer of ethylene and an alpha olefin prepared by the method of claim 13.

27. A succinate ester-succinimide derivative of a copolymer of ethylene and an alpha olephin.

28. A copolymer derivative according to claim 27 wherein the alpha olefin is propylene.

29. A copolymer derivative according to claim 27 wherein the ester is a n—$C_4$ to n—$C_{22}$ ester.

30. A copolymer derivative according to claim 27 wherein the ester is a n—$C_{12}$ to n—$C_{18}$ ester.

31. A copolymer derivative according to claim 27 wherein the succinimide portion comprises a polyamine having the formula:

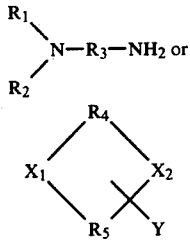

wherein
$R_1$ and $R_2$ are the same or different and are alkyl radicals having 1 to 4 carbon atoms;
$R_3$ is a methylene radical having 1 to 4 carbon atoms;
$R_4$ and $R_5$ are the same or different and are methylene or methine radicals having 1 to 4 carbon atoms;
$X_1$ is O, S, NH, N—$R_1$ or $CH_2$ (if $R_4$ and $R_5$ are methylene radicals) or N or CH (if $R_4$ and $R_5$ are methine radicals);
$X_2$ is N or NH and
Y is $NH_2$ or $R_3$—$NH_2$.

32. A copolymer derivative according to claim 27 wherein nitrogen content is 0.01 to 1.0 weight percent.

33. A copolymer derivative according to claim 27 wherein the derivative is the n—$C_4$ to n—$C_{22}$ succinate ester-dimethylaminopropyl succinimide derivative of ethylenepropyl copolymer.

34. A lubricating oil composition comprising a major portion of a lubricating oil and a minor portion, sufficient to increase the viscosity index, depress the pour point and increase the dispersancy of said lubricating oil, of a fatty alkyl succinate ester-succinimide derivative of a copolymer of ethylene- and an alpha-olefin prepared according to claim 1.

35. A lubricating oil composition according to claim 34 wherein the copolymer derivative is the copolymer derivative of claim 16.

36. A lubricating oil composition according to claim 34 wherein the copolymer derivative is the copolymer derivative of claim 17.

37. A lubricating oil composition according to claim 34 wherein the copolymer derivative is the copolymer derivative of claim 18.

38. A lubricating oil composition according to claim 34 wherein the copolymer derivative is the copolymer derivative of claim 20.

39. A lubricating oil composition according to claim 34 wherein the copolymer derivative is the copolymer derivative of claim 21.

40. A lubricating oil composition according to claim 34 wherein the copolymer derivative is the copolymer derivative of claim 22.

41. A lubricating oil composition according to claim 34 wherein the copolymer derivative is the copolymer derivative of claim 23.

42. A lubricating oil composition according to claim 34 wherein the copolymer derivative is the copolymer derivative of claim 25.

43. A lubricating oil composition according to claim 34 wherein the copolymer derivative is the copolymer derivative of claim 26.

44. A lubricating oil composition according to claim 34 wherein the copolymer derivative is the copolymer derivative of claim 27.

45. A lubricating oil composition according to claim 34 wherein the copolymer derivative is the copolymer derivative of claim 28.

46. A lubricating oil composition according to claim 34 wherein the copolymer derivative is the copolymer derivative of claim 29.

47. A lubricating oil composition according to claim 34 wherein the copolymer derivative is the copolymer derivative of claim 31.

48. A lubricating oil composition according to claim 34 wherein the copolymer derivative is the copolymer derivative of claim 33.

49. A lubricating oil composition according to claim 34 wherein the minor amount is 0.10 to 5.0 weight percent.

50. A lubricating oil additive concentrate comprising a hydrocarbon solvent and about 5 to about 30 weight percent, based on solvent, of a fatty alkyl succinate-succinimide derivative of a copolymer of ethylene and an alpha olefin prepared to claim 1.

51. A lubricating oil additive concentrate according to claim 50 wherein the copolymer derivative is the copolymer derivative of claim 16.

52. A lubricating oil additive concentrate according to claim 50 wherein the copolymer derivative is the copolymer derivative of claim 17.

53. A lubricating oil additive concentrate according to claim 50 wherein the copolymer derivative is the copolymer derivative of claim 18.

54. A lubricating oil additive concentrate according to claim 50 wherein the copolymer derivative is the copolymer derivative of claim 20.

55. A lubricating oil additive concentrate according to claim 50 wherein the copolymer derivative is the copolymer derivative of claim 21.

56. A lubricating oil additive concentrate according to claim 50 wherein the copolymer derivative is the copolymer derivative of claim 22.

57. A lubricating oil additive concentrate according to claim 50 wherein the copolymer derivative is the copolymer derivative of claim 23

58. A lubricating oil additive concentrate according to claim 50 wherein the copolymer derivative is the copolymer derivative of claim 25.

59. A lubricating oil additive concentrate according to claim 50 wherein the copolymer derivative is the copolymer derivative of claim 26.

60. A lubricating oil additive concentrate according to claim 50 wherein the copolymer derivative is the copolymer derivative of claim 27.

61. A lubricating oil additive concentrate according to claim 50 wherein the copolymer derivative is the copolymer derivative of claim 28.

62. A lubricating oil additive concentrate according to claim 50 wherein the copolymer derivative is the copolymer derivative of claim 29.

63. A lubricating oil additive concentrate according to claim 50 wherein the copolymer derivative is the copolymer derivative of claim 31.

64. A lubricating oil additive concentrate according to claim 50 wherein the copolymer derivative is the copolymer derivative of claim 33.

65. A lubricating oil additive concentrate according to claim 50 wherein the hydrocarbon solvent is a light lubricating oil having a viscosity of between about 75 and 300 SUS at 100° F.

* * * * *